(No Model.)
J. GRAY.
DYNAMO ELECTRIC MACHINE.
No. 374,959. Patented Dec. 20, 1887.
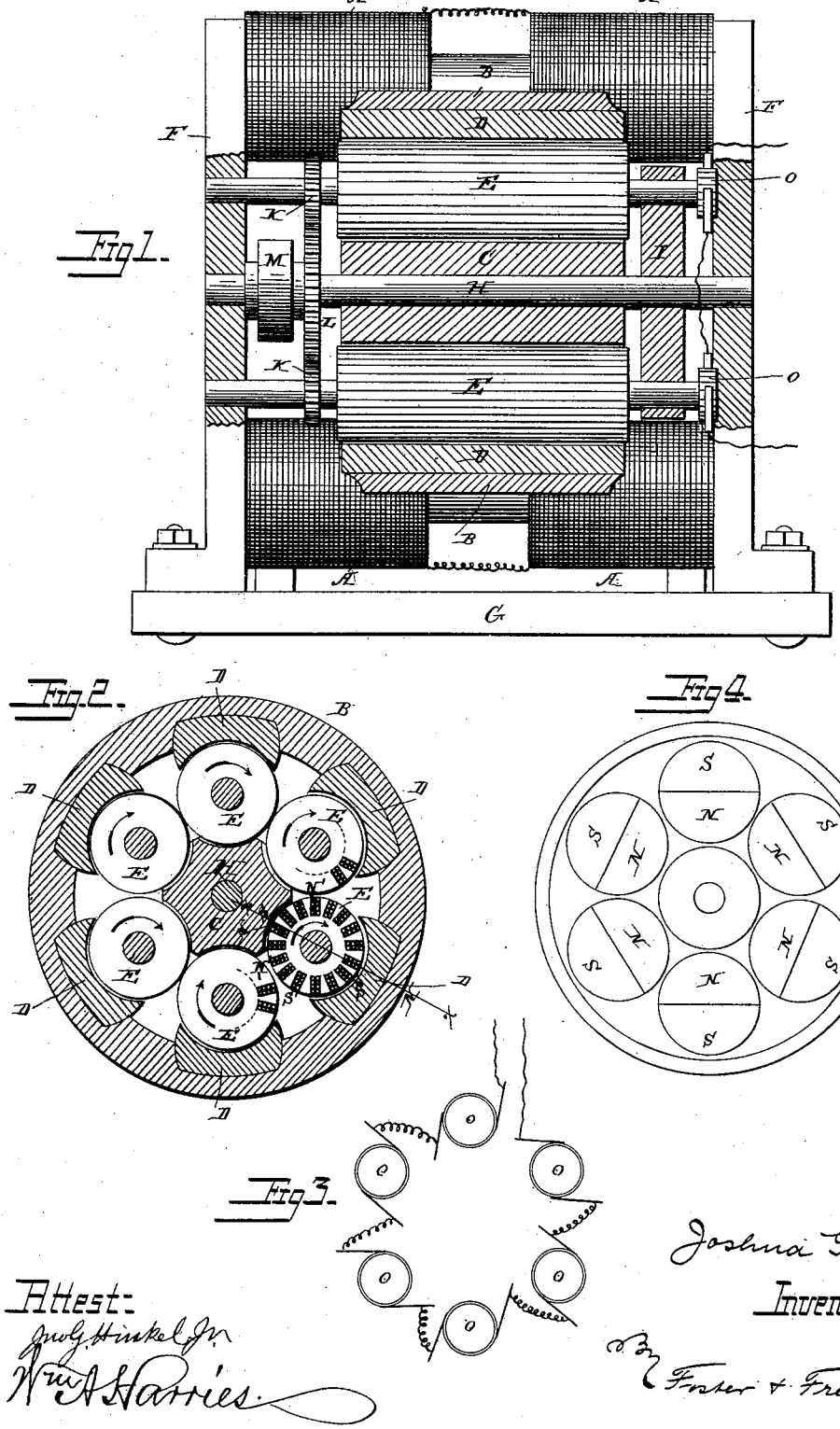

UNITED STATES PATENT OFFICE.

JOSHUA GRAY, OF MEDFORD, MASSACHUSETTS.

DYNAMO-ELECTRIC MACHINE.

SPECIFICATION forming part of Letters Patent No. 374,959, dated December 20, 1887.

Application filed November 26, 1886. Serial No. 219,982. (No model.)

*To all whom it may concern:*

Be it known that I, JOSHUA GRAY, a citizen of the United States, residing at Medford, in the county of Middlesex and State of Massachusetts, have invented certain new and useful Improvements in Dynamo-Electric Machines, of which the following is a specification.

In dynamo-electric machines as heretofore constructed the armature which revolves between the poles of a field-magnet has to overcome the attraction of such magnet as it passes from point to point in close proximity to the same. The more current developed the greater is the resistance to rotation of the armature; but this resistance to the rotation of the armature increases more rapidly than the generation of current, so that, if one horse-power is required for the generation of a certain current, more than two horse-powers will be required for the generation of a current of double the strength. It is for this reason economically impracticable to work a dynamo-machine up to its full capacity.

The object of my invention is to overcome this difficulty by so constructing a dynamo-electric generator that when the speed of the armature is increased beyond its mean velocity the resistance of the field will not be perceptibly increased, so that the current generated will be proportionate to the mechanical force consumed. I accomplish this object by constructing the field-magnet with one annular and one central pole, and each preferably having a number of corresponding recesses which receive an armature rotating within the same, and so arranged relatively to each other that their opposite poles act upon each other by attraction, and thereby assist each other in their motion between the poles of the field-magnet. This assistance becomes more effective when more current is generated, and thus beyond a certain point no additional mechanical force will be consumed in overcoming the resistance of the field. All this will more clearly appear from the following description, with reference to the accompanying drawings, in which—

Figure 1 shows a sectional side view of one practical form of my invention; Fig. 2, a cross-section of the field-magnet and armatures, and Fig. 3 a diagrammatic view of the commutators and brushes of the same. Fig. 4 shows a modification of my improved arrangement of the field-magnet and armatures.

Referring now to Figs. 1 and 2, the field-magnet is shown as constructed with two legs, A A, connected by two iron plates, F F, of magnetic material, which also constitute a portion of the frame. These plates are bolted to a base, G, which may be of non-magnetic material. The legs A are wound with insulated wire in such manner as to produce a pole midway between the coils of each leg, as is usual. The other poles will then be produced in the plates F F and in their polar extension C, which is magnetically connected with the middle of such plates by a fixed shaft, H. The poles in the legs A A are connected by an iron ring, B, provided with a number of polar shoes, D, which are recessed, as indicated. Said recesses correspond to similar recesses in the polar extension C, and within each pair of the same is an armature, E, wound in any desired or improved manner. As shown in the drawings, the ring B is the extension of two like consequent poles only, there being only two wound legs to the field-magnet; but it will be understood that I may employ more than one pair of such legs, in which case there will be a greater number of distinctive consequent poles joined by the ring B, and a similar increased number of opposite consequent poles will then be united by the polar extension C. I have shown the ordinary Siemens armature of the cylinder form, and by arrows I have indicated the direction of rotation of the same. Supposing now that the ring B and consequently the shoes D are of north polarity and the polar extension C of south polarity, then the side of the cylinder-armature which faces the ring will be of south polarity and the side which faces the polar extension C will be of north polarity. The maximum intensities of each such system will be in a straight line which passes through the cylinders of the armature and polar extension C, and which bisects the shoe D, as indicated by $x\ x$. This, however, is strictly true only when the armature is at rest, and for this condition the poles are indicated by the letters S N; but if the armature rotates in the direction indicated by the arrows the maximum of polarity in the same will be shifted to the points S' and N' by reason of its coercive force, which resists a change of polarity.

The greater the speed of the armature the greater will be the deviation of the magnetic axis of the armature from that of the field-magnet, and in my improved machine this phenomenon is utilized for overcoming the resistance of the field to the rotation of the armatures, as will presently appear.

By the shifting of the magnetic axis the opposite poles of two adjacent armatures N' and S' are brought within attractive proximity to each other, as will be seen by reference to Fig. 2. These two poles of adjacent armatures will therefore react upon each other in such a manner as to promote the rotation of each armature. This operation is continuous and not intermittent as long as the armatures rotate; but by reason of the greater shifting of the magnetic axis when the velocity of the armatures is greater the assistance obtained by the reaction of the shifted poles increases with the velocity of the machine.

It will now be understood that as soon as the machine has acquired such velocity as to bring the shifted poles of adjacent armatures within attractive range a further increase of velocity will not be attended by additional resistance to the rotation of the armatures. This I consider to be a most important result, due to the relative location and co operation of the elements of my machine.

The mechanical arrangement of the parts is of minor importance, and I do not propose to limit my invention to any specific construction.

I have shown the armatures mounted in bearings on one side in the plate F and on the the other side in a plate, I. They are each provided with a pinion, K, which pinions mesh with a spur-wheel, L, mounted loosely upon shaft H, and driven by a belt upon pulley M. The commutators O are suitably mounted with one end of the armatures, and they may be connected in series, as shown in Fig. 3, or in multiple arc or multiple series, if so desired.

In a modification of my invention shown in Fig. 4 I dispense with the recesses in the ring B and in the center polar extension C. Other modifications will readily suggest themselves to those skilled in the art without the exercise of invention.

What I claim as my invention, and desire to secure by Letters Patent, is—

1. In a dynamo-electric machine, the combination of a field-magnet having an annular and a central pole, with a series of armatures rotating within the field and arranged with their shifted poles in inductive proximity to each other, substantially as described.

2. In a dynamo-electric machine, the combination of an exterior and interior field-magnet pole with a series of armatures rotating in the same direction within the magnetic field and in inductive proximity to each other, substantially as described.

3. In a dynamo-electric machine, the combination of a field-magnet having a circular series of circular recesses in its poles, with a rotary armature for each pair of recesses, and mechanism for rotating said armatures, all in the same sense, substantially as described.

In testimony whereof I have signed my name to this specification in the presence of two subscribing witnesses.

JOSHUA GRAY.

Witnesses:
CHAS. HALL ADAMS,
MARTIN McDONOUGH.